No. 826,594. PATENTED JULY 24, 1906.
F. L. MORSE.
METHOD AND APPARATUS FOR GAGING TEMPERATURES.
APPLICATION FILED OCT. 15. 1903.

WITNESSES
Jas. B. MacDonald
J. S. Custer

INVENTOR
Frank L. Morse
by E. Wright Att'y.

UNITED STATES PATENT OFFICE.

FRANK L. MORSE, OF TRUMANSBURG, NEW YORK, ASSIGNOR OF ONE-THIRD TO HENRY H. WESTINGHOUSE, OF NEW YORK, N. Y.

METHOD AND APPARATUS FOR GAGING TEMPERATURES.

No. 826,594.      Specification of Letters Patent.      Patented July 24, 1906.

Application filed October 15, 1903. Serial No. 177,185.

*To all whom it may concern:*

Be it known that I, FRANK L. MORSE, a citizen of the United States, residing in Trumansburg, county of Tompkins, and State of New York, have invented certain new and useful Improvements in the Method and Apparatus for Gaging Temperatures, of which the following is a specification.

This invention relates to the method and apparatus for measuring or gaging the temperature of things which have the property of changing their color with different degrees of heat, and it is particularly applicable to gaging the temperature of metals in hardening, annealing, tempering, and otherwise working or manipulating the metal.

In the working of metal—such as iron and steel, for example—it is necessary that the metal be brought to certain degrees of temperature in order that it may be subjected to certain operations or modes of treatment with the best results. It has also been found that with metals, such as iron and steel, which when heated above a certain temperature become incandescent and emit a light of their own the different degrees or shades of color always correspond with certain degrees of temperature or, in other words, that a metal heated to a certain shade of red always corresponds with the same temperature.

The object of this invention is to provide means utilizing this principle, whereby the heated metal may be readily compared with one or more standard shades of colored light in order to determine when the shade of the heated metal corresponds with that of the desired colored light and is therefore of the desired temperature.

The mechanism embodying the invention may assume many different forms and be varied in accordance with the character of the work to be tested.

Figure 1:
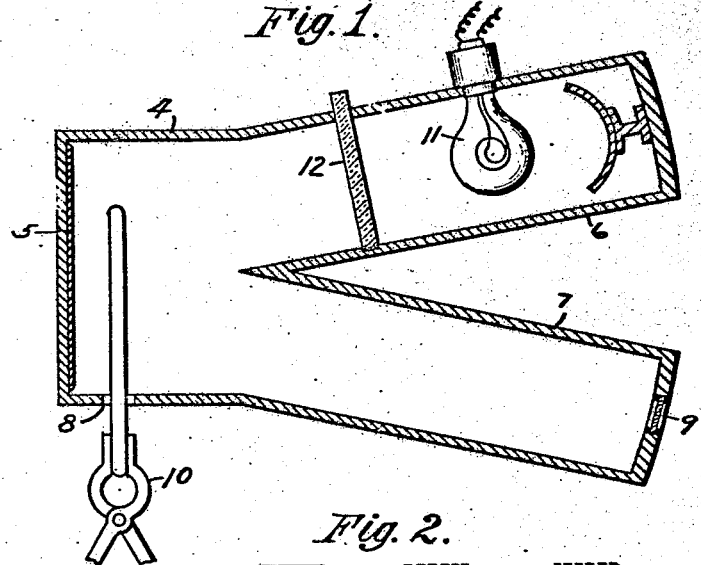
Figure 2:
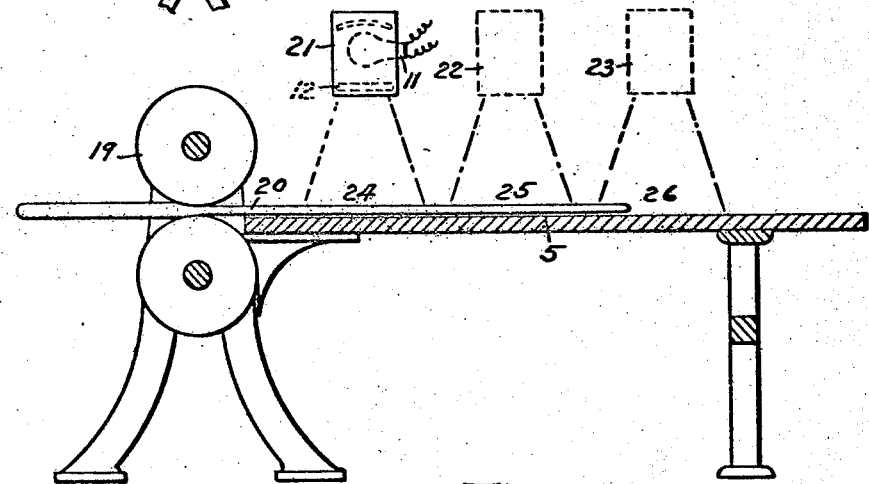
Figure 3:
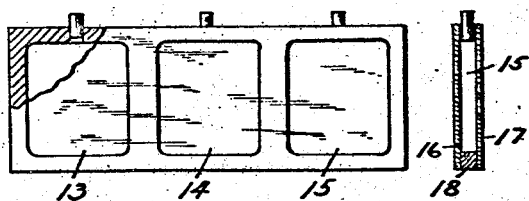

In the accompanying drawings, Figure 1 shows one form of a device embodying my invention for testing the temperatures of small pieces of metal which may be readily manipulated by hand, while Fig. 2 illustrates the invention adapted for use with large pieces of metal not so readily handled; and Fig. 3 represents in elevation and vertical transverse section one form of lens or flask that may be used to produce lights of different shades of color.

According to the form of device which is graphically represented in Fig. 1 a casing 4 is provided with an opening 8, through which small pieces of metal to be tested may be inserted by means of tongs 10 or in any other suitable way. The wall of the casing forms a background 5, which may be illuminated by any suitable light, such as an incandescent lamp 11, which is preferably shielded and may be inclosed in a tubular extension 6 of the casing, so as to throw its light upon the background and upon the article or metal to be tested. Another tubular extension 7, having a sight-opening 9, is provided for inspection purposes and is preferably so arranged that the view is in line with the illuminated background and the metal to be tested. The background is preferably of some neutral tint—such as gray, for example—and any suitable color may be displayed thereon and on the metal to be tested in accordance with that which the metal must show when heated to the desired temperature. For this purpose a suitable colored medium 12, such as glass, either plain or in the form of a lens, may be interposed between the source of light 11 and the background. This colored medium is standardized for a certain temperature, and it is the color of this medium that furnishes the standard color to the background or field which is illuminated by said colored light, whereby to gage the temperature of the article or metal to be tested. When the article is inserted into this field of colored light between the illuminated background and the colored medium, so that the light falls upon a portion only of the article, comparison may be made between the article and the background or between the shades of color of the two parts of the article itself, and if these appear uniform with no shadow or line of demarcation between the part within the illuminated field and the part without said field then the temperature of said article will correspond with that of the standardized color. This standardized medium may consist of a transparent flask containing a colored liquid, if desired. I have devised a compound or multiple flask in which are compartments containing liquids of different shades of color representing, respectively, different standards. Such flask is illustrated in Fig. 3. It consists of two plates of plain glass 16 and 17 between which is cemented a sheet of rubber or other suitable material, through which apertures are made whereby chambers are formed, as at 13, 14, and 15, for the colored liquids. The liquid in chamber 13 may be light red, in 14 medium red, and in 15 dark red, or they may be of other desired standard shades of any suitable color.

The invention may be adapted to keep a watch upon steel, for example, while being forged or rolled. One way of doing this is illustrated in Fig. 2, wherein 19 represents rolls and 20 a bar of steel passing through the rolls. Preferably at the side of the rolls is located the background 5, onto which colored light is thrown in a manner such that the observer or workman may look at the steel and beyond it see the illuminated background, and thereby accurately determine the instant when the temperature of the steel falls below the desired temperature at which it is to be worked. Upon said background several fields or areas of different colors may be projected, substantially as indicated in Fig. 2, wherein by the instruments at 21, 22, and 23 fields of three different shades of color may be produced, as at 24, 25, and 26, respectively. This will enable the workman to watch a particular portion of the bar 20 as it passes to or from the rolls. The multiple flask of Fig. 3 would serve well in such an arrangement as that just described, and by it a workman may bring a piece of work to one of the particular shades of color or to a point between two different shades.

In Fig. 2 the background may be under or back of the bar to be tested, so that the bar itself passes through one or more of the illuminated fields 24, 25, and 26 of colored light, and in this way color of the bar may be compared not only with that of the standardized colors of the different illuminated backgrounds, but also with other parts of itself which are bathed in the rays of the different-colored fields.

Various other modifications of apparatus may be made for adapting this invention to different forms of work, while at the same time employing the essential features of my invention, which comprise any means for projecting a light through a standardized colored medium, thus forming a beam or field of colored light for illuminating a background or a portion of the article to be tested, whereby the heated article may be compared with the standardized color.

Having now described my invention, what I claim as new, and desire to secure by Letters Patent, is—

1. In an apparatus for gaging temperatures, a background in position to be viewed, means for presenting before said background a thing to be tested, and means for bathing the surface of said background nearest the thing to be tested with rays of light of a suitable color to cause said surface in reflecting said rays to appear to be of the desired standardized color.

2. In an apparatus for gaging temperatures, a background of a neutral color and located in position to permit the object to be viewed to be interposed between the eye of the observer and said background, and means for bathing said background in a beam of light adapted to illuminate said background with the color required for comparison, thereby providing a field of view of the desired standardized color by which to gage the temperature of the thing desired.

3. In an apparatus for gaging temperatures, a casing provided with a background adapted for illumination and with an aperture through which a thing to be tested may be inserted in front of the background, an opening through which said background may be viewed, the means for projecting upon said background a standardized color with which the thing to be tested may be directly compared.

4. In an apparatus for gaging temperatures, a flask for containing a colored fluid consisting of two plates of glass cemented to the opposite faces of a sheet which is impervious to fluid and is provided with an aperture through the middle to form the receptacle for said fluid.

5. In an apparatus for gaging temperatures, a multiple flask consisting of a device provided with a succession of transparent receptacles filled with liquids of different standardized shades of the same color for the purpose set forth.

6. In an apparatus for gaging temperatures, a background adapted for illumination and to permit the object to be compared therewith to be interposed between the eye and said background, and means for illuminating said background so as to cause the same to present a series of fields, each presenting different shades of standardized color of such character as to permit comparison of an artificially-heated object with said color-field.

7. In an apparatus for gaging temperatures, a background of a neutral color in position to permit the thing to be tested to be interposed between the background and the eye, a source of light and a translucent color medium interposed between the background and the light and adapted to cause the same to be illuminated with the standardized color.

8. An apparatus for gaging temperatures, comprising a translucent color medium, means for projecting rays of light through said medium upon a background, and means for inserting the article to be tested into said rays or field of colored light between the eye and said background.

9. An apparatus for gaging temperatures, comprising a translucent color medium, means for projecting rays of light through said medium, and means for inserting the article to be tested into the field of view and bathing a portion of said article in said rays of colored light.

10. An apparatus for gaging temperatures, comprising a translucent color medium, means for projecting rays of light through said medium, a background to be illuminated by said rays of colored light, means for inserting the article to be tested in the field of view and bathing a portion of said article in said colored rays.

11. The method of determining the temperature of a highly-heated article, which consists in imparting to light-rays a standardized color, projecting said rays upon a portion of the heated article, and comparing the color of the portion of the article bathed in the colored light with the other portion of the article.

In testimony whereof I have hereunto set my hand.

FRANK L. MORSE.

Witnesses:
  DAVID B. PERRY,
  JOHN S. WHITE.